United States Patent
Bhat

(10) Patent No.: US 9,875,148 B2
(45) Date of Patent: Jan. 23, 2018

(54) DETECTING DEADLOCKS INVOLVING INTER-PROCESSOR INTERRUPTS

(71) Applicant: International Business Machines Corporation, Armonk, NY (US)

(72) Inventor: Srivatsa S. Bhat, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 14/316,881

(22) Filed: Jun. 27, 2014

(65) Prior Publication Data
US 2015/0378791 A1 Dec. 31, 2015

(51) Int. Cl.
| G06F 13/24 | (2006.01) |
| G06F 9/52 | (2006.01) |
| G06F 12/14 | (2006.01) |

(52) U.S. Cl.
CPC .......... *G06F 9/524* (2013.01); *G06F 12/1466* (2013.01); *G06F 2212/1052* (2013.01)

(58) Field of Classification Search
None
See application file for complete search history.

(56) References Cited

U.S. PATENT DOCUMENTS

| 6,473,819 | B1 * | 10/2002 | Jackson et al. ........... G06F 9/52 710/200 |
| 6,996,812 | B2 | 2/2006 | McKenney |
| 7,162,666 | B2 | 1/2007 | Bono |
| 8,151,027 | B2 | 4/2012 | Zimmer et al. |
| 2002/0194436 | A1* | 12/2002 | McKenney ............... G06F 9/52 711/152 |
| 2005/0027914 | A1 | 2/2005 | Hammalund et al. |
| 2006/0143610 | A1 | 6/2006 | Toader |
| 2007/0006198 | A1* | 1/2007 | Kakivaya et al. ....... G06F 9/524 717/151 |
| 2009/0064176 | A1 | 3/2009 | Ohly et al. |
| 2011/0107151 | A1* | 5/2011 | Che ......................... G06F 9/524 714/38.1 |

(Continued)

FOREIGN PATENT DOCUMENTS

| JP | 07-105152 | * | 4/1995 |
| WO | 1989000734 A1 | | 1/1989 |

OTHER PUBLICATIONS

Liu, Chuansheng, "[Patch V2] smp: Give Warn()ing when calling smp_call_function_many()/single() in serving irq", Feb. 16, 2013, GMANE, Intel, <http://article.gmane.org/gmane.linux.kernel/1442615>.

(Continued)

*Primary Examiner* — Ilwoo Park
(74) *Attorney, Agent, or Firm* — David B. Woycechowsky

(57) ABSTRACT

Creating, maintaining and using a lock dependency graph in a way that includes the following steps: (i) acquiring a first restriction on processor access in a multi-processor computer system; (ii) modeling the first restriction as first locking primitive information; and (iii) storing data corresponding to the first locking primitive information in a lock dependency graph. The first restriction on processor access is one of the following two types: (i) disabling the interrupts on a given processor; and/or (ii) sending inter-processor interrupts with synchronous waiting from one processor to another (including itself).

8 Claims, 2 Drawing Sheets

(56) References Cited

U.S. PATENT DOCUMENTS

2014/0310694 A1    10/2014  Granshaw et al.
2015/0067215 A1*   3/2015   Henry .................. G06F 1/3237
                                                      710/261

OTHER PUBLICATIONS

Jiangshan, Lia, "Re: [Patch V2] smp: Give Warn()ing when calling smp_call_function_many()/single() in serving irq", Feb. 27, 2013, GMANE, Gmail, <http://article.gmane.org/gmane.linux.kernel/1448085>.

* cited by examiner

US 9,875,148 B2

DETECTING DEADLOCKS INVOLVING INTER-PROCESSOR INTERRUPTS

BACKGROUND OF THE INVENTION

The present invention relates generally to the field of handling processor deadlocks, and more particularly to recording deadlock information in a "lock dependency graph."

In computer science, a deadlock is a situation where multiple actions, processes and/or resources are waiting for the other to finish, in a circular fashion. For example: (i) in a two-way deadlock, process A waits on process B, and process B waits on process A; (ii) in a three-way deadlock, process A waits on process B, process B waits on process C, and process C waits on process A; and (iii) and so on. In the language of the art, a "resource" typically does not wait for another resource. Rather, it is almost always the case that "processes" wait for resources, because processes are the active entities in the system. A typical 2-process deadlock can be described as a situation which occurs when a process A holding a resource A enters a waiting state because a resource B that it is requesting, is held by a different process B, and this process B in turn is waiting on the resource A which is held by process A. In other words, processes A and B end up waiting forever on each other to release their respective resources, and hence both fail to make any forward progress. The system is then said to be in a deadlock. This scenario can also be extended to describe a multi-process deadlock, where a group of more than 2 processes end up waiting on processes within that group in a circular fashion, such that each process waits indefinitely on another process and hence cannot achieve any forward progress.

A system is in a state of deadlock when the "Wait-for Graph" (as in who waits for whom) for the entities in question has a cycle in the graph (that is, there is a circular dependency between the entities, for example: A waits for B and B waits for A, and no action/process/resource gives up on waiting).

One known technique that helps with detecting, predicting and/or handling of processor deadlocks is the use of a "lock dependency graph." Conventionally, an up-to-date lock dependency graph can let the system know that a deadlock is about to happen.

"Lock dependency graph" is defined, for purposes of this document, as a set of information about "locks" that currently exist, or are imminently expected to come to exist, in a computer system; a "lock dependency graph" may additionally maintain detailed information about nesting of locks and/or information regarding how and when locks are acquired and/or are to be released. Conventionally, the "locks" recognized by the "lock dependency graph" are limited to the following types of "locking primitives": (i) acquiring or releasing a spin-lock (single-holder non-sleepable lock); (ii) acquiring a spin-lock accompanied by disabling the interrupts, or releasing a spin-lock accompanied by enabling the interrupts; (iii) acquiring or releasing a reader-writer spin-lock (also known, more simply, as "reader-writer lock") for read; (iv) acquiring or releasing a reader-writer spin-lock for write; (v) acquiring a reader-writer spin-lock for read, accompanied by disabling the interrupts or releasing a reader-writer spin-lock for read, accompanied by enabling the interrupts; (vi) acquiring a reader-writer spin-lock for write, accompanied by disabling the interrupts or releasing a reader-writer spin-lock for write, accompanied by enabling the interrupts; (vii) acquiring or releasing a mutex-lock (single-holder sleepable lock); (viii) acquiring or releasing a semaphore (sleepable lock with user-defined degree of concurrent access to the protected resource or critical section); (ix) acquiring or releasing a reader-writer semaphore for read; and (x) acquiring or releasing a reader-writer semaphore for write. Herein, a lock acquired under one of the foregoing types of conventionally recognized locking primitives will be referred to as a "conventional lock."

SUMMARY

According to an aspect of the present invention, there is a method, computer program product and system for performing the following steps (not necessarily in the following order): (i) acquiring a first restriction on processor access in a multi-processor computer system; (ii) modeling the first restriction as first locking primitive information; and (iii) storing data corresponding to the first locking primitive information in a lock dependency graph. The first restriction on processor access is one of the following two types: (i) disabling the interrupts on a given processor; and/or (ii) sending inter-processor interrupts with synchronous waiting from a source processor to a target processor (the source and target processor may be the same processor).

DETAILED DESCRIPTION

Figure 1:
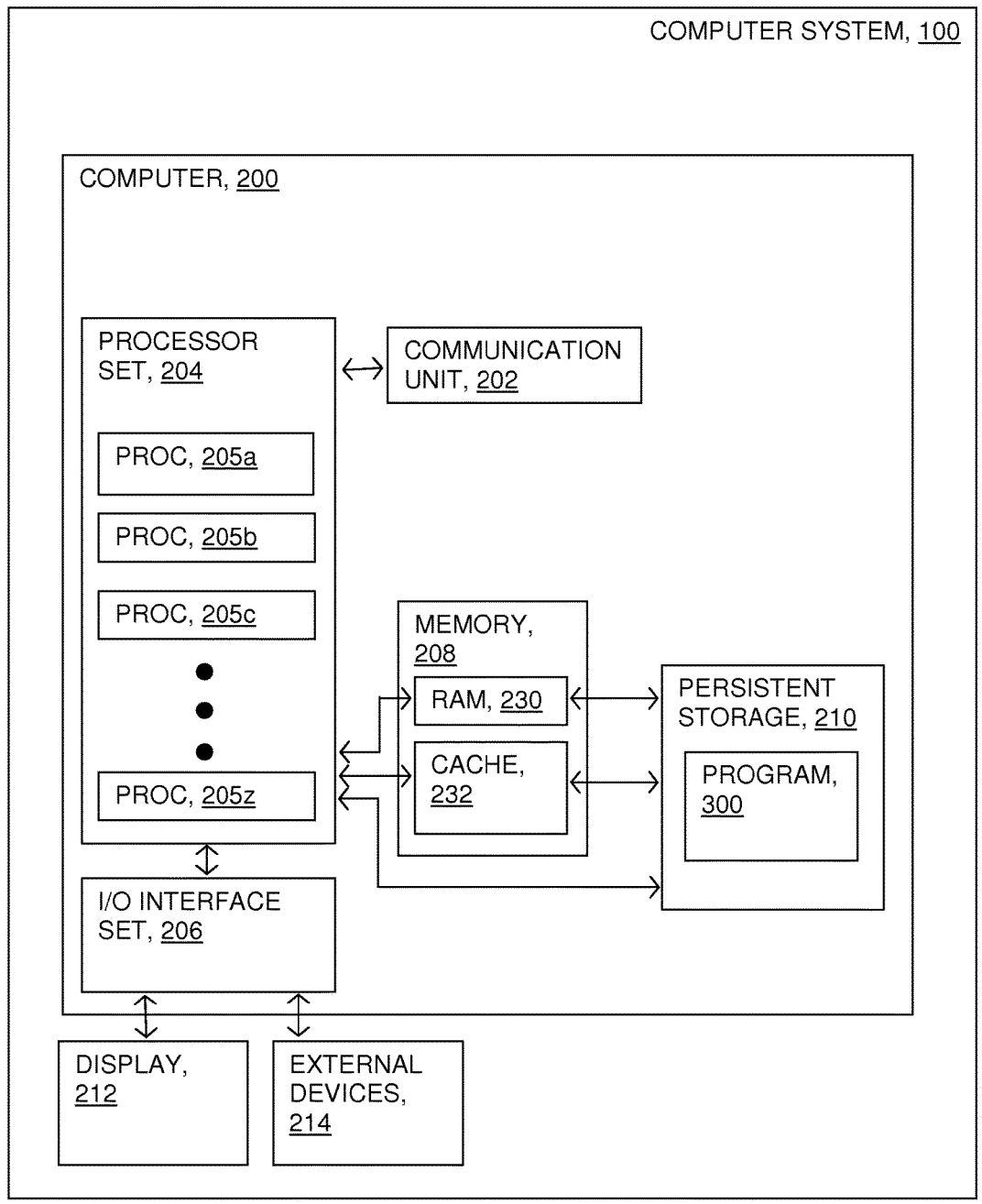
FIG. 1 is a schematic view of a first embodiment of a system according to the present invention.

Some embodiments of the present disclosure model, as locking primitive information in a lock dependency graph, one, or more of the following types of restrictions on processor access: (i) disabling the interrupts on a given processor; and/or (ii) sending inter-processor interrupts with synchronous waiting from one processor to another (that is, sending the interrupt from the source processor to a target processor and synchronously waiting in the source processor, for the target processor to complete running the corresponding interrupt handler). This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a functional block diagram illustrating computer system 100, including: computer 200; communication unit 202; processor set 204 (including processors 205a to z); input/output (I/O) interface set 206; memory device 208; persistent storage device 210; display device 212; external device set 214; random access memory (RAM) devices 230; cache memory device 232; and program 300.

System 100 is shown as a block diagram with many double arrows. These double arrows (no separate reference numerals) represent a communications fabric, which provides communications between various components of system 100. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for system 100; and/or (ii) devices external to system 100 may be able to provide memory for system 100.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to system 100. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
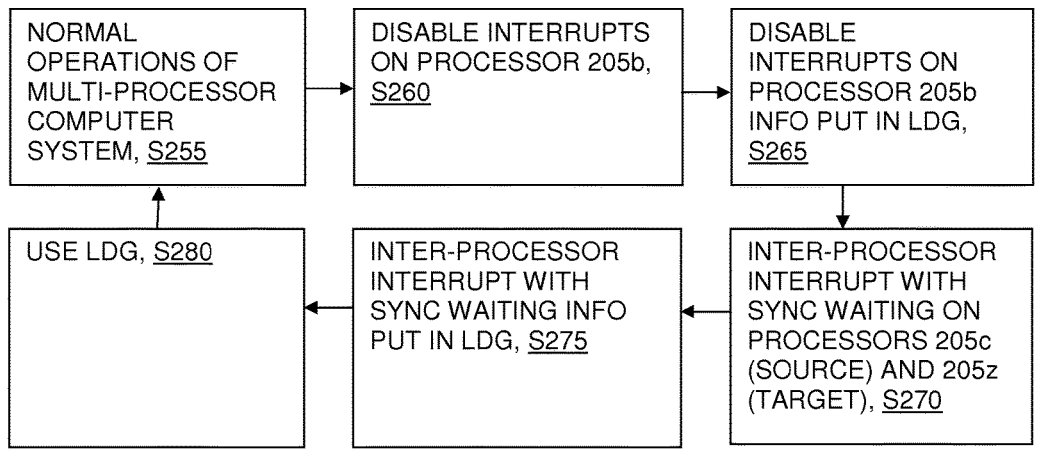
FIG. 2 is a flowchart showing a method performed, at least in part, by the first embodiment system.
Figure 3:
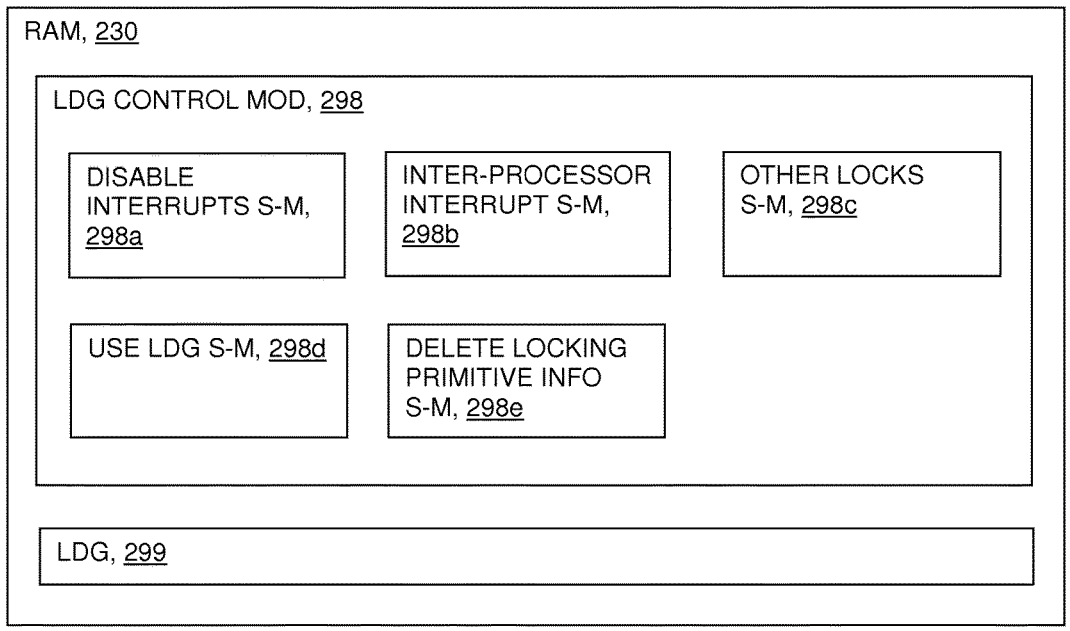
FIG. 3 is a schematic view of a machine logic (for example, software) portion of the first embodiment system.

FIG. 2 shows flowchart 250 depicting a method according to the present invention. FIG. 3 shows LDG control mod 298 and LDG 299 for performing at least some of the method steps of flowchart 250. This method and associated software will now be discussed, over the course of the following paragraphs, with extensive reference to FIG. 2 (for the method step blocks) and FIG. 3 (for the software blocks). As shown in FIG. 3, LDG control module ("mod") 298 is a set of hardware and/or software-based machine readable instructions that controls the storing of locking primitive data in LDG (also sometimes referred to as LDG data store) 299. LDG 299 includes locking primitive data for all processors 205a to z (see FIG. 1). Program 300 is a non-volatile copy of mod 298—the machine readable instructions of mod 298 can be stored in a volatile and/or non-volatile manner.

Processing begins at step S255, where multi-processor computer system engages in normal operations, using its processors 205a to z (see FIG. 1) for its processing power. As part of its normal operations, and as in conventional computers, LDG control mod 298 keeps track of when the various processors acquire and release various types of conventionally recognized locks, and writes and erases corresponding locking primitive information to and from LDG 299. These conventionally-recognized types of locks are identified above, in the Background section. More specifically: (i) other locks sub-mod 298c (see FIG. 3) writes locking primitive info for conventionally recognized locks to LDG 299; and (ii) delete locking primitive info sub-mod 298e (see FIG. 3) deletes locking primitive info.

Processing proceeds to step S260, where processor 205b (see FIG. 1) becomes subject to a disable interrupts restriction on its accessibility. "Disable interrupts" is a conventionally known type of restriction on processor access, as those of skill in the art will understand and appreciate.

Processing proceeds to step S265, where disable interrupts sub-mod 298a writes locking primitive info to LDG data store 299 corresponding to the disable interrupts restriction of step S260. In other words, disable interrupts sub-mod 298a models the disable interrupts restriction as if it were another type of lock, and places corresponding locking primitive information into LDG 299.

Processing proceeds to step S270, where processors 205c and z (see FIG. 1) become subject to an inter-processor interrupt with sync (short for 'synchronous') waiting type restriction on its accessibility. "Inter-processor interrupt with sync waiting" is a conventionally known type of restriction on processor access, as those of skill in the art will understand and appreciate. More specifically, "inter-processor interrupt with sync waiting" means the sending of an inter-processor interrupt from a source processor to a target processor and synchronously waiting in the source processor, for the target processor to complete running the corresponding interrupt handler.

Processing proceeds to step S275, where inter-processor interrupt sub-mod 298b writes locking primitive info to LDG data store 299 corresponding to the inter-processor interrupt restriction of step S270. In other words, inter-processor interrupt sub-mod 298b models the inter-processor interrupt with sync waiting restriction as if it were another type of lock, and places corresponding locking primitive information into LDG 299.

Processing proceeds to step S280, where use LDG submod 298*d* uses the locking primitive info stored in LDG 299 for various purposes, such as attempting to predict and/or identify deadlocks. This topic will be further discussed, below, in the Further Comments And/Or Embodiments sub-section of this Detailed Description section.

Processing loops back to step S255 for continued normal operations. While this example of flow chart 250 happened to encounter a disable interrupts restriction, an inter-processor interrupt with sync waiting restriction and a use (or consultation) of LDG 299 in succession, these three events will not always (or even usually) occur in this order—these three events are merely presented this way for pedagogical and clarity-of-understanding purposes. A main point that this example of processing intends to convey is that the system models, as locking primitive information in a lock dependency graph, one, or more of the following types of restrictions on processor access: (i) disabling the interrupts on a given processor; and/or (ii) sending inter-processor interrupts with synchronous waiting, from one processor to another (that is, sending the interrupt from the source processor to a target processor and synchronously waiting in the source processor, for the target processor to complete running the corresponding interrupt handler).

III. Further Comments and/or Embodiments

Some embodiments of the present invention may include one, or more, of the following features, characteristics and/or advantages: (i) a method of drawing a parallel between "routine operations" (such as, "disabling interrupts" and "sending inter-processor interrupts with synchronous waiting") and an appropriate class of locking primitives; and/or (ii) perform software modeling in such a manner as to detect deadlocks involving "routine operations" (for example, "disabling interrupts" and "sending inter-processor interrupts with synchronous waiting") in a variety of scenarios by applying currently conventional deadlock detection algorithms.

Some embodiments of the present invention may further include one, or more, of the following features, characteristics and/or advantages: (i) detecting deadlock (also known as 'self-deadlock') on a single CPU (Central Processing Unit or Processor) caused by sending an inter-processor interrupt (with synchronous waiting) to itself (also known as a self-IPI) while having the interrupts disabled on that CPU; (ii) detecting deadlock between two, or more, CPUs by sending inter-processor interrupts (with synchronous waiting) to each CPU in a circular fashion, while having the interrupts disabled on all involved CPUs; (iii) detecting deadlock between two CPUs where the circular dependency between them is caused by a mixture of locks, disabling of interrupts and sending inter-processor interrupts with synchronous waiting; (iv) detecting multiple-CPU deadlocks (as mentioned above, multiple-processor or multiple-CPU deadlocks mean that more than two processors are involved in the deadlock) where the circular dependency between the CPUs is caused by a mixture of locks, disabling of interrupts and sending inter-processor interrupts with synchronous waiting; and/or (v) predicting a probability of a deadlock even if the deadlocks did not actually trigger and/or occur during a test run.

Further with regard to item (iii) in the list of the previous paragraph, the scenario causing the circular dependency between the two CPUs will now be discussed. The circular dependency occurs when all of the following conditions are met: (a) CPU-1 acquires a lock and sends an inter-processor interrupt with synchronous waiting to CPU-2; (b) the lock acquired by CPU-1 is a single-holder non-sleepable lock (hence, any other CPU trying to acquire that lock will fail (that is, spin/busy-loop/poll) until CPU-1 releases the lock); and (c) CPU-2 disables its interrupts and tries to acquire the same lock which is already held by CPU-1. To explain in more detail, CPU-2 will not recognize the inter-processor interrupt sent by CPU-1 because CPU-2 has disabled its interrupts and is waiting for CPU-1 to release the lock. CPU-1 will not release the lock because it is waiting synchronously for CPU-2 to recognize and handle the inter-processor interrupt. Thus, CPU-1 and CPU-2 will enter a deadlock.

Further with regard to item (iv) in the list two paragraphs previous, examples of a deadlock involving three (3) CPUs are: (a) CPU-1 disables its interrupts and tries to acquire lock-A; (b) CPU-2 acquires lock-A and tries to acquire lock-B; and (c) CPU-3 acquires lock-B and sends an inter-processor interrupt with synchronous waiting, to CPU-1.

A method of modeling the "disabling of interrupts" and "sending inter-processor interrupts with synchronous waiting" as a form of locking operations on per-CPU reader-writer locks will now be discussed. This method detects the various types of deadlocks mentioned earlier in this sub-section. The method of modeling includes several steps which will be respectively discussed over the following several paragraphs.

Step (i): define a per-CPU rwlock (reader-writer lock). That is, define an instance of rwlock for each CPU in the system.

Step (ii) do not allow reader-to-writer lock promotion. That is, if a CPU acquires an rwlock for read, and also subsequently tries to acquire the same rwlock for write (while still holding the rwlock for read), it should result in a deadlock (also known as a self-deadlock). This helps the machine logic detect self-deadlocks caused by a CPU disabling its interrupts and then sending an inter-processor interrupt to itself (self-IPI) with synchronous waiting.

Step (iii) "disabling interrupts on CPU-X" should be treated as CPU-X acquiring the rwlock of CPU-X for read. Generally, the machine logic cannot use simple per-CPU spinlocks to model these operations because spinlocks are not recursive. That is, they deadlock if acquired recursively, whereas interrupts can be disabled recursively, any number of times on a CPU, without deadlocking. For this reason, this embodiment uses rwlocks for its model, because they allow recursive reader-side locking. In some embodiments of the present disclosure, step (iii) in the method of the preceding paragraph is enhanced to treat "disabling interrupts on CPU-X" as independent instances of "disabling interrupts on CPU-Y", where Y is varied to represent all the CPUs in the system.

Step (iv) "sending an inter-processor interrupt with synchronous waiting from CPU-A to CPU-B" should be treated as CPU-A trying to acquire the rwlock of CPU-B for write.

At step (iv), this embodiment is enhanced to treat "sending an inter-processor interrupt with synchronous waiting, from CPU-A to CPU-B", as independent instances of "sending an inter-processor interrupt with synchronous waiting, from CPU-A to CPU-Z", where Z is varied to represent all the other CPUs in the system. The enhancements mentioned in connection with steps (iii) and (iv) help in an advanced form of deadlock detection (which might be termed as "deadlock prediction"), where even the "possibility" of a deadlock can be detected, even if the deadlock did not actually occur during the test run. These enhancements are necessary in order to be able to predict the deadlocks, because the CPU on which the microcode runs and disables interrupts, determines the particular rwlock which is acquired for 'read,' and, similarly, the CPU which is chosen as the target of the inter-processor interrupt determines the particular rwlock which is acquired for 'write.' This is due to the per-CPU nature of the rwlocks previously described. If the microcode ran only on one of the available CPUs and/or if it chose only one of the available CPUs as the target of an inter-processor interrupt, it would be impossible to predict all the deadlock possibilities. For these reasons, by treating the disabling of interrupts on CPU-X as having a similar effect on all the CPUs, and treating the action of sending an inter-processor interrupt with synchronous waiting from CPU-A to CPU-B, as sending inter-processor interrupts with synchronous waiting from CPU-A to all other CPUs, the software tries to simulate all the deadlock scenarios, and this helps in predicting deadlocks in those scenarios as well.

Some embodiments of the present invention may further include one, or more, of the following features, characteristics and/or advantages: (i) detect deadlocks (see definition of "deadlocks" in the Definitions sub-section of this detailed description section) involving the disabling of interrupts; (ii) predict deadlocks involving the disabling of interrupts; (iii) sending inter-processor interrupts with synchronous waiting; (iv) uses per-CPU reader-writer locks to model the interrupt-disable; (v) uses per-CPU reader-writer locks to model inter-processor-interrupt operations; (vi) draws a parallel between per-CPU reader-writer locks (with special semantics) and routine operations such as disabling interrupts; (vii) draws a parallel between per-CPU reader-writer locks (with special semantics) and routine operations such as sending inter-processor interrupts with synchronous waiting; and/or (xii) solves problems that arises while using inter-processor interrupts, as opposed to problems which may occur in implementing inter-processor interrupts.

Some embodiments of the present invention may further include one, or more, of the following features, characteristics and/or advantages: (i) provides a per-CPU solution; (ii) draws a parallel from scenarios such as disabling interrupts and sending IPIs (inter-processor interrupts), etc., to known concepts, such as reader-writer locks; (iii) the software method/model is extended to be per-CPU because disabling of interrupts as well as IPIs (inter-processor interrupts) are fundamentally a per-CPU concept (as opposed to a global concept), where disabling of interrupts is always carried out on a given CPU, and an IPI is always used between two (2) CPUs; and/or (iv) can be modeled as a per-CPU variant of rwlocks.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, server computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
   disabling local interrupts for a first processor in a computer system;
   disabling local interrupts for a second processor in the computer system;
   sending a set of inter-processor interrupt(s) with synchronous waiting from the first processor to the second processor;
   sending a set of inter-processor interrupt(s) with synchronous waiting from the second processor to the first processor; and
   detecting, by machine logic, a deadlock between a plurality of deadlocked processors, including the first and second processors, based, at least in part, on the following: (i) the disabling of local interrupts for the first processor in a computer system, (ii) the disabling of local interrupts for the second processor in the computer system, (iii) the sending of the set of inter-processor interrupt(s) from the first processor to the second processor, and (iv) the sending of the set of inter-processor interrupt(s) from the second processor to the first processor.

2. The method of claim 1 further comprising:
   disabling local interrupts for a third processor in the computer system; and
   sending a set of inter-processor interrupt(s) with synchronous waiting from the third processor to at least one of the first processor and the second processor;
   wherein:
   the detection of the deadlock further determines that the third processor is included in the plurality of deadlocked processors based, at least in part, on the following: (i) the disabling of local interrupts for the third processor, and (ii) the sending of the set of inter-processor interrupt(s) from the third processor.

3. The method of claim 1 wherein:
   the first processor is a central processing unit (CPU); and
   the second processor is a CPU.

4. A method for use with a computer system including a first processor and a second processor, the method comprising:
   acquiring, by the first processor, a first lock;
   responsive to acquisition of the first lock, sending, by the first processor to the second processor, an inter-processor interrupt request with synchronous waiting;

disabling local interrupts on the second processor;

subsequent to disabling local interrupts on the second processor, requesting, by the second processor, the first lock; and detecting, by machine logic, a deadlock between the first processor and the second processor caused by a mutual dependency between the first processor and the second processor based, at least in part, upon the following: (i) the acquisition of the first lock by the first processor, (ii) the sending, by the first processor to the second processor, the inter-processor interrupt request with synchronous waiting, (iii) the disabling of local interrupts on the second processor, (iv) the request, by the second processor, for the first lock.

5. The method of claim 4 wherein:

the first processor is a central processing unit (CPU); and the second processor is a CPU.

6. A method comprising:

performing a first run of a piece of computer code;

during the first run, disabling local interrupts for a first processor in a computer system;

during the first run, disabling local interrupts for a second processor in the computer system;

during the first run, sending a set of inter-processor interrupt(s) with synchronous waiting from the first processor to the second processor;

during the first run, sending a set of inter-processor interrupt(s) with synchronous waiting from the second processor to the first processor; and predicting, by machine logic, a possibility of a future deadlock between a plurality of deadlocked processors, including the first and second processors, with respect to running of the piece of computer code based, at least in part, on the following: (i) the disabling of local interrupts for the first processor in a computer system, (ii) the disabling of local interrupts for the second processor in the computer system, (iii) the sending of the set of inter-processor interrupt(s) from the first processor to the second processor, and (iv) the sending of the set of inter-processor interrupt(s) from the second processor to the first processor;

wherein no actual deadlock occurs during the first run.

7. The method of claim 6 further comprising:

during the first run, disabling local interrupts for a third processor in the computer system; and during the first run, sending a set of inter-processor interrupt(s) with synchronous waiting from the third processor to at least one of the first processor and the second processor;

wherein:

the prediction of the possibility of the future deadlock further determines that the third processor is included in the plurality of deadlocked processors based, at least in part, on the following: (i) the disabling of local interrupts for the third processor, and (ii) the sending of the set of inter-processor interrupt(s) from the third processor.

8. The method of claim 6 wherein:

the first processor is a central processing unit (CPU); and the second processor is a CPU.

\* \* \* \* \*